April 22, 1952 C. C. S. LE CLAIR 2,594,039

APPARATUS FOR DISPENSING LUBRICANT TO THE WHEELS OR ROLLERS OF CHAIN CONVEYERS

Filed Oct. 12, 1946 10 Sheets-Sheet 1

Inventor:

Camille Clare Sprankling Le Clair

By Hinkle, Horton, Ahlberg, Hausmann & Wupper

Attorneys.

April 22, 1952

C. C. S. LE CLAIR 2,594,039

APPARATUS FOR DISPENSING LUBRICANT TO THE WHEELS OR ROLLERS OF CHAIN CONVEYERS

Filed Oct. 12, 1946

10 Sheets-Sheet 2

Inventor

Camille Claire Sprankling Le Clair

By Hinkle, Horton, Ahlberg, Hansmann & Wupper

Attorneys.

Inventor:
Camille Clare Sprankling Le Clair
By Zinke, Horton, Ahlberg, Hausmann & Kappes
Attorneys.

Inventor:
Camille Claire Sprankling Le Clair
By Hinkle, Horton, Dahlberg, Hausmann & Wupper
Attorneys.

April 22, 1952 C. C. S. LE CLAIR 2,594,039

APPARATUS FOR DISPENSING LUBRICANT TO THE WHEELS OR ROLLERS OF CHAIN CONVEYERS

Filed Oct. 12, 1946 10 Sheets-Sheet 5

Inventor:

Camille Clare Sprankling Le Clair

By Hinkle, Horton, Adelberg, Hammann & Wupper

Attorneys.

Inventor:
Camille Clare Sprankling Le Clair
By Hinkle, Horton, Ahlberg, Hanemann & Wapper
Attorneys.

April 22, 1952 C. C. S. LE CLAIR 2,594,039

APPARATUS FOR DISPENSING LUBRICANT TO THE WHEELS OR ROLLERS OF CHAIN CONVEYERS

Filed Oct. 12, 1946

10 Sheets-Sheet 7

Inventor:

Camille Clare Sprankling Le Clair

By Hinkle, Horton, Alsberg, Hausmann & Hopper

Attorneys.

April 22, 1952 C. C. S. LE CLAIR 2,594,039

APPARATUS FOR DISPENSING LUBRICANT TO THE WHEELS OR ROLLERS OF CHAIN CONVEYERS

Filed Oct. 12, 1946 10 Sheets-Sheet 8

Inventor:

Camille Clare Sprankling Le Clair

By Hinkle, Horton, Ahlberg, Hansmann & Kupper

Attorneys.

April 22, 1952 C. C. S. LE CLAIR 2,594,039

APPARATUS FOR DISPENSING LUBRICANT TO THE WHEELS OR ROLLERS OF CHAIN CONVEYERS

Filed Oct. 12, 1946

10 Sheets-Sheet 9

Inventor:
Camille Clare Sprankling Le Clair
By Hinkle, Horton, Ahlberg, Hansmann & Wupper
Attorneys.

Inventor:
Camille Claire Sprunkling Le Clair
By Hinkle, Horton, Ashbey, Hausmann & Stappe
Attorneys.

UNITED STATES PATENT OFFICE 2,594,039

APPARATUS FOR DISPENSING LUBRICANT TO THE WHEELS OR ROLLERS OF CHAIN CONVEYERS

Camille Clare Sprankling Le Clair, Acton, London, England, assignor to Tecalemit Limited, Brentford, England, a corporation of Great Britain Application October 12, 1946, Serial No. 703,064
In Great Britain October 19, 1945

23 Claims. (Cl. 184—15)

This invention provides improved apparatus for dispensing lubricant to the wheels or rollers of chain conveyors and to the wheels of rolling stock, such as railway wagons or trucks, colliery and other tubs and so on. For simplicity of description, chain conveyors and all types of rolling stock to which this invention is applicable will be termed "conveyors" hereinafter.

A chain conveyor usually comprises two parallel endless chains joined by transverse spindles at convenient intervals, which spindles carry guiding, or supporting, wheels. In certain conveyors, at intervals, usually at every second or third spindle, a container is suspended from or attached to a spindle for carrying the material to be conveyed.

Such conveyors often operate under very adverse conditions, sometimes being exposed to the weather and frequently carrying abrasive material such as coke or sand. Moreover, they are sometimes placed at such a height as to make access difficult. These circumstances combine on the one hand to render efficient and regular lubrication essential and on the other to make it extremely difficult and hence the wear and tear on the conveyor chains is often very heavy.

A particular object of the present invention is to provide apparatus for automatically dispensing lubricant to the spindles of chain conveyors, such as briefly referred to above, for the lubrication of the wheels, links, etc. carried by the spindles.

According to the present invention, lubricant is automatically dispensed to the spindles of a conveyor (hereinafter referred to as a "main conveyor") while the latter is in motion by means of lubricating apparatus comprising a subsidiary endless conveyor (hereinafter referred to as a "satellite conveyor") which is arranged at one side of the main conveyor with one of its runs adjacent to and parallel, or substantially parallel, to the main conveyor and which receives its motion from, and moves in correct timed relationship with, the main conveyor, and which also carries one lubricant-dispensing device or a number of spaced lubricant-dispensing devices (hereinafter called "grease guns"), spaced driving means on the main conveyor adapted to cooperate with spaced driven means on the satellite conveyor so as to drive the latter and means for ensuring that the or each grease gun or an operative part thereof, while travelling in that run of the satellite conveyor which is adjacent and parallel to, and travelling in the same direction as, the main conveyor, shall be moved towards the main conveyor from an inoperative position into an operative position so as to cause the grease gun to make lubricant-tight contact with, and dispense lubricant to, one of the spindles of the main conveyor.

The relationship between the spacing of the driving means on the main conveyor and the spacing of the driven means on the satellite conveyor is such that before the motion of the satellite conveyor can cease owing to the dis-engagement of a driven means on the satellite conveyor from a driving means on the main conveyor, another driving means and another driven means operatively engage one another to take over the driving of the satellite conveyor.

One or more plunger-type grease guns may be carried by the satellite conveyor, which latter may be of the endless chain type. The gun or each gun is mounted upon the satellite conveyor in association with a driven means and such that during the time it is being moved with the run of the satellite conveyor which is moving in the same direction as, and is adjacent to, the main conveyor, the gun, or an operative part of the gun, is first forced bodily toward the main conveyor so that the gun nozzle makes sealing engagement with a grease-receiving nipple on one of the main conveyor spindles. Thereafter, the plunger of the grease gun is forced to carry out a lubricant-discharging stroke and the gun, or the operative part of the gun, is then retracted bodily away from the main conveyor into its initial position.

The driving means on the main conveyor may consist of the spindles of the conveyor, and the driven means in the satellite conveyor may consist of guide members which, when several guns are used, may be attached to, or form parts of, the grease guns themselves or their housings, these members being formed with lodgements in which the advancing main conveyor spindles can engage.

The or each grease gun (which is referred to hereinafter as the "filling gun") may be of the non-self-charging type, in which case separate means will be provided for charging the gun while it is moving along with the satellite conveyor. Such means may, for example, consist of one or more supplementary grease guns (hereinafter referred to as "charging guns") carried by a turnable member which receives its motion from the satellite conveyor, the arrangement being such that as the or each grease gun makes its revolution of the turnable member, the charging gun, or one of the charging guns, is brought into sealing engagement with the filling gun, whereafter the charging gun charges the filling gun with grease and is then retracted.

In many cases it will not be necessary to perform the lubricant dispensing operation continuously whenever the main conveyor is running. Hence, in order to avoid over lubrication of the main conveyor and also unnecessary wear of the lubricant dispensing apparatus, it is preferred to mount the apparatus in such a manner that it may be moved bodily into and out of its operative position or, in other words, toward or away from the main conveyor.

Over-lubrication may also be avoided by mounting one grease gun only upon the satellite conveyor and by providing the latter with as many driven means as may be necessary, these means being appropriately spaced upon the satellite conveyor.

In a constructional form of this arrangement which is described hereinafter, the driven means take the form of forked brackets which are adapted to be engaged by the spindles of the main conveyor, the single grease gun itself being provided with a hooked bracket for the same purpose.

It will be appreciated that the lubricating apparatus may be used for dispensing grease or oil.

Further constructional features of the present invention will be referred to hereinafter.

Constructional forms of the invention, applied to a vertically-upward-moving, bucket type main conveyor, are shown, by way of example, on the accompanying drawings, whereon:

Figure 6:
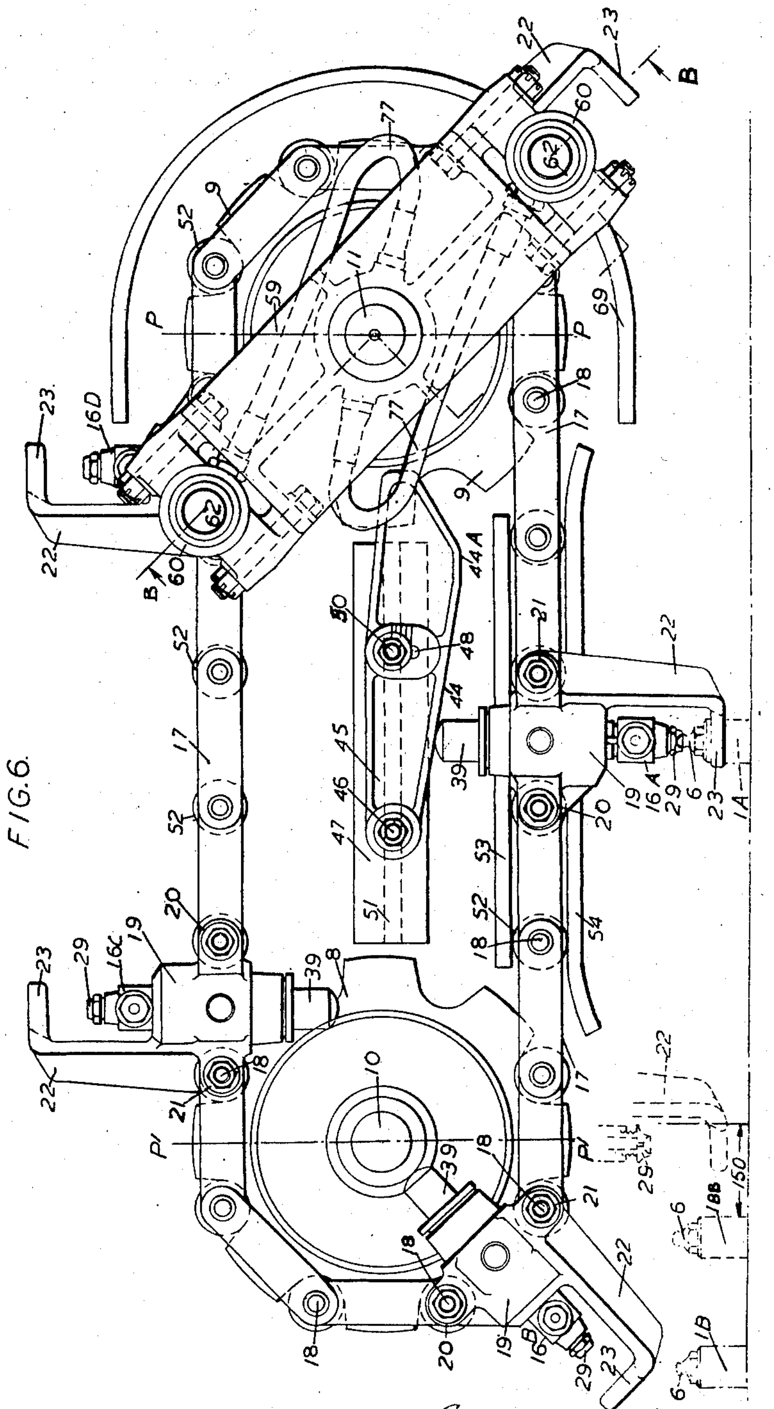
Fig. 6 is a plan view of the lubricating apparatus at the line A—A in Fig. 5.
Figure 7:
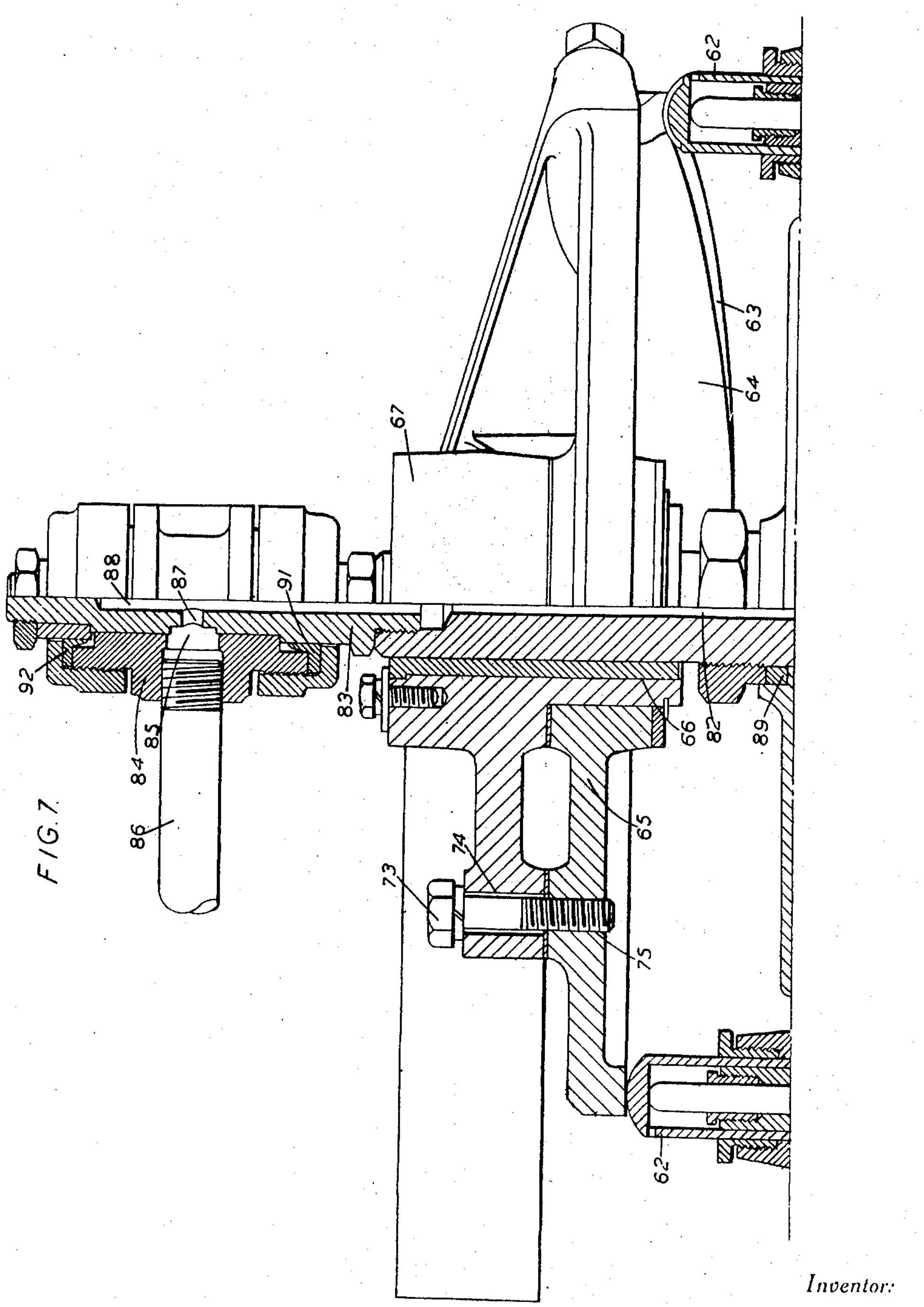
Figure 7A:
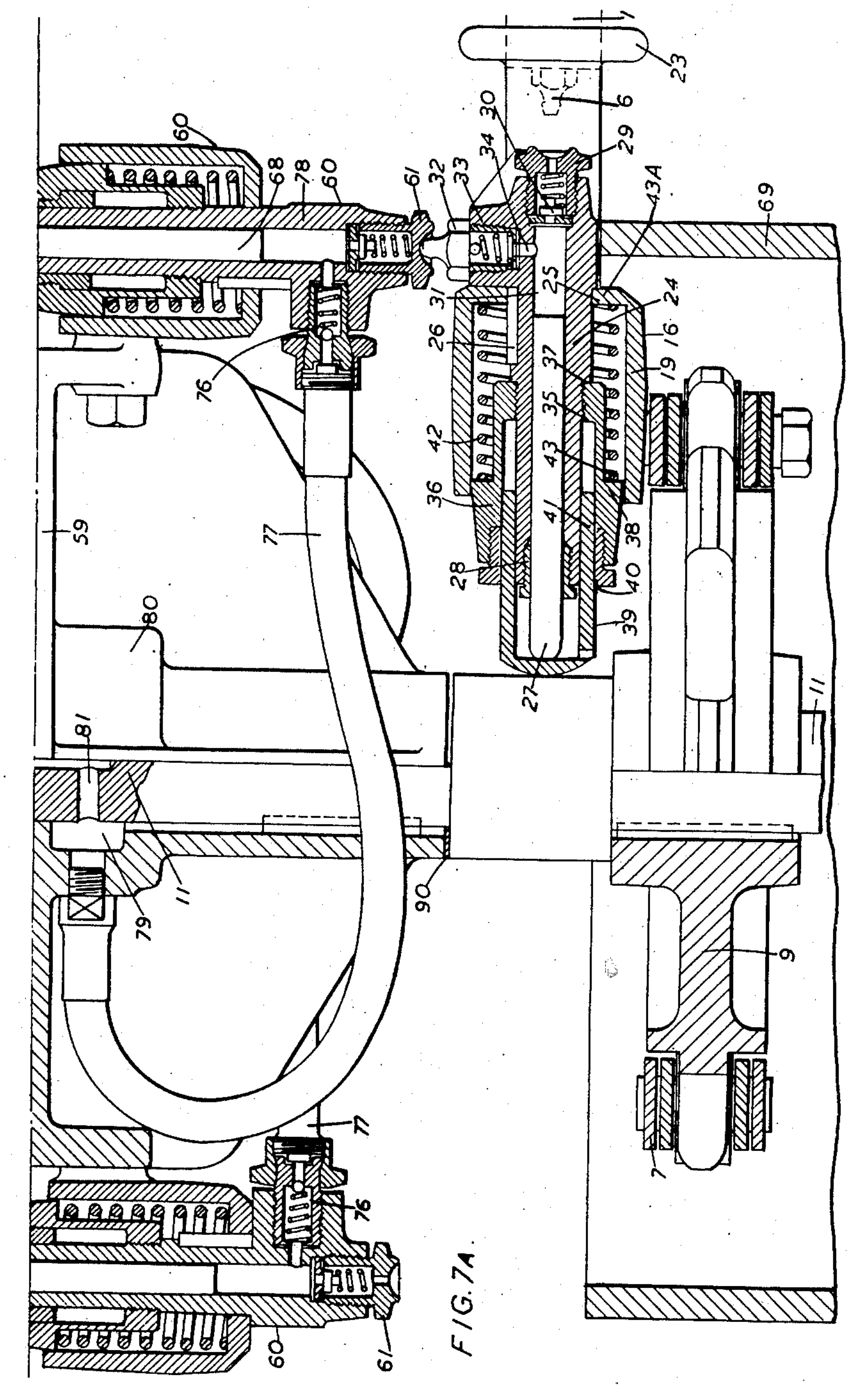
Figure 8:
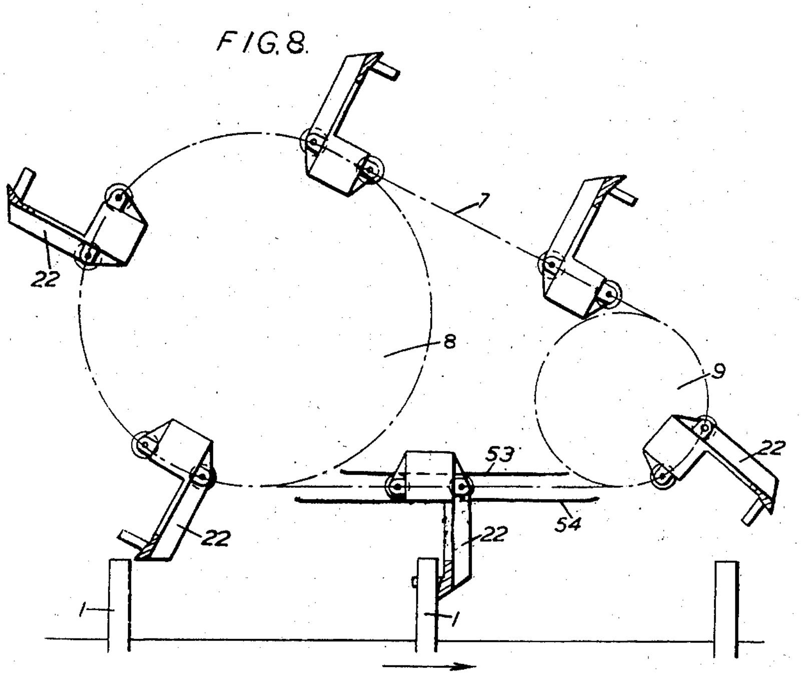
Figure 9:
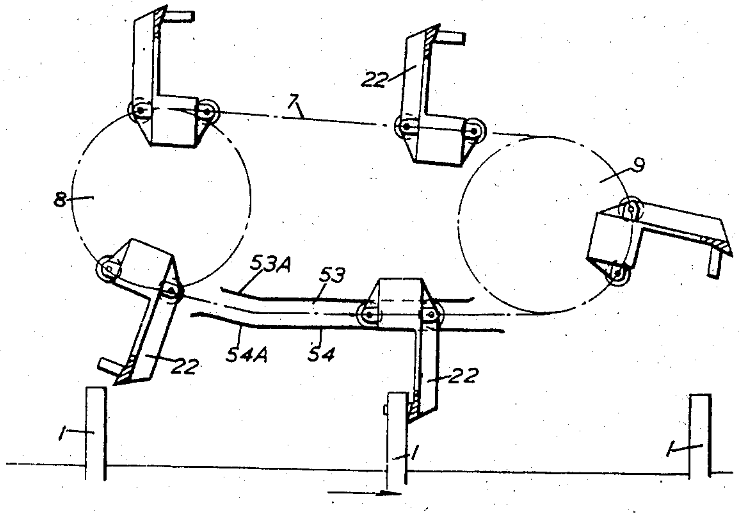
Figure 10:
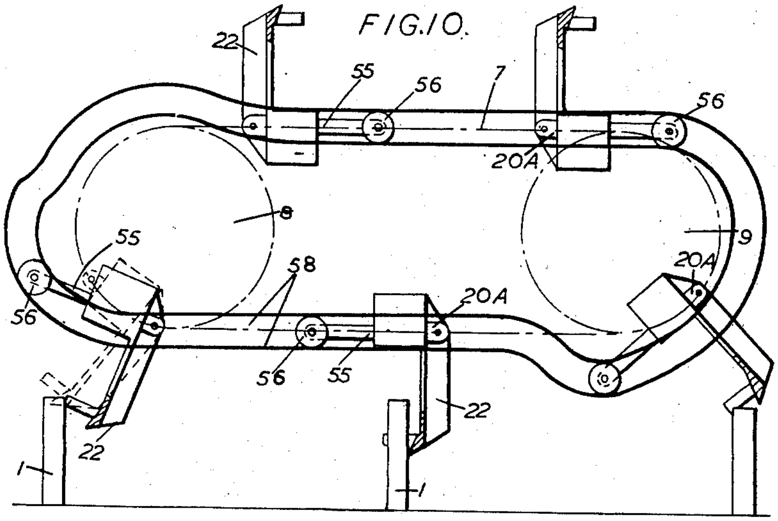
Figure 11:
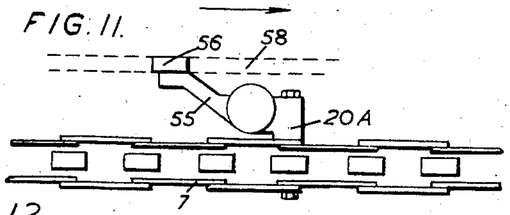
Figures 12, 13:
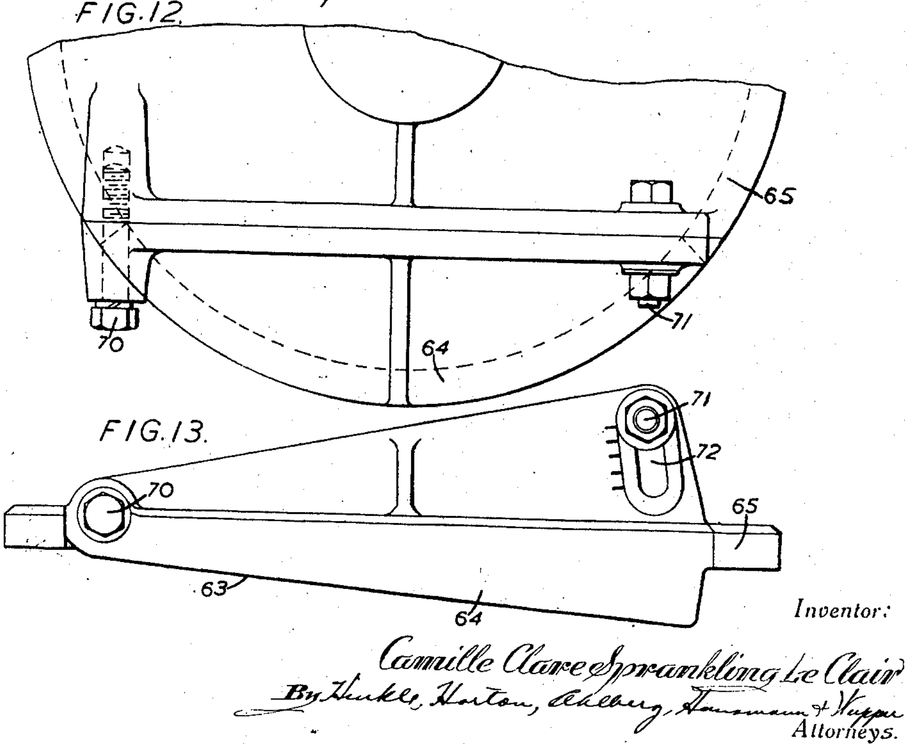
Figure 14:
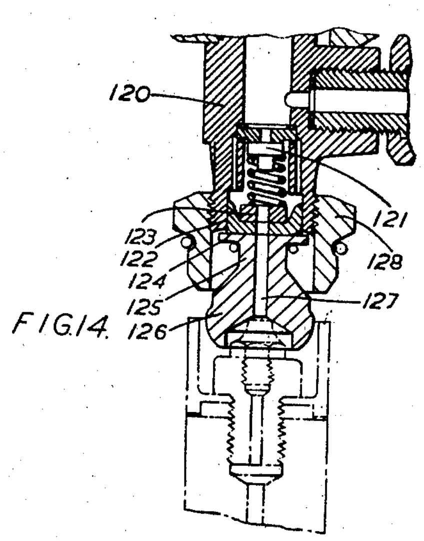
Figures 15, 16:
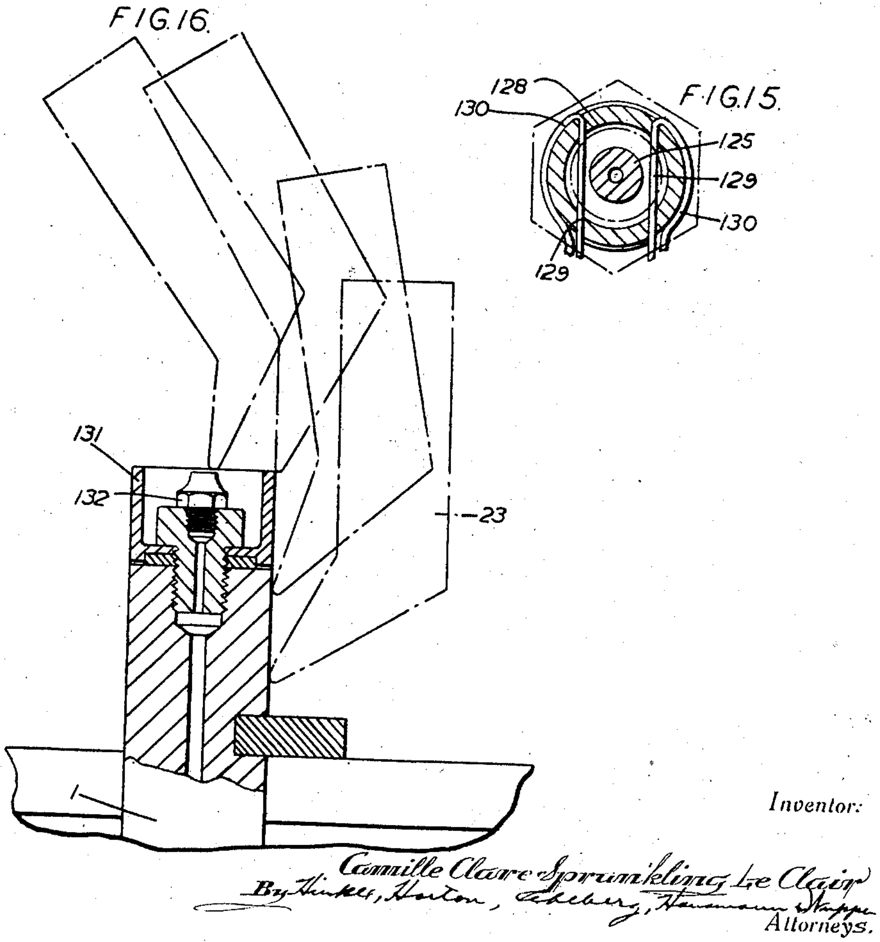

Figs. 7 and 7A together are a part sectional view of the lubricating apparatus on the line B—B in Fig. 6;

Fig. 8 is a diagrammatic view of a modified arrangement of the satellite conveyor of the lubricating apparatus designed to ensure that the forked guide brackets on the filling guns do not foul the advancing spindles of the main conveyor;

Fig. 9 is a diagrammatic view of a further modified arrangement of the satellite conveyor designed with the same object as the arrangement shown in Fig. 8;

Figs. 10 and 11 respectively are a side view and plan view of a further modified arrangement of the satellite conveyor designed with the same objects as the arrangements shown in Figs. 8 and 9;

Fig. 12 is a fragmentary plan view of an adjustable segmental cam member which is used to operate the charging guns;

Fig. 13 is an elevation of the segmental cam member;

Fig. 14 is a sectional view of the nozzle end of the barrel of a grease gun which is fitted with a swivelling nozzle;

Fig. 15 is a section through the shell nut and the swivelling nozzle shown in Figure 14; and Fig. 16 is a sectional view of one of the ends of a main conveyor spindle fitted with a protecting sleeve for the nipple.

Referring first to Figs. 1 to 4:

The main conveyor is of the endless chain type and comprises a number of horizontal spindles 1, each carrying a guide wheel 2 at each end. The spindles are connected by links 3 arranged on opposite sides of the guide wheels and the latter run between track members 4 in the usual manner. Buckets 5 are mounted upon alternate spindles of the conveyor. Each spindle is provided with a grease nipple 6 through which lubricant is fed, in a manner to be described hereinafter, into a lubricant duct in the spindle and thence to the bearings of the guide wheels and links on the latter.

Briefly, the means for automatically lubricating the main conveyor comprises a satellite or grease gun carrying conveyor chain 7 mounted at one side of the main conveyor with one or part of one of its runs of chain parallel to the vertical run of the main conveyor. The endless chain of the satellite conveyor runs over a lower sprocket 8 and also over an upper sprocket 9 which is spaced vertically from the lower sprocket, see Fig. 6. The two sprockets are mounted upon horizontal parallel spindles 10 and 11 which are arranged at right angles to the spindles 1 of the main conveyor and are turnably carried in bearing members 12 and 12A (Fig. 1) attached to a movable frame work which includes two spaced, transverse channel bars 13 and 14 and which will be more fully described hereinafter.

In order that successful lubrication of the guide wheels and links of the main conveyor may take place, the following operations must be accomplished:

As each spindle 1 of the main conveyor passes the lubricating apparatus a grease gun of the latter must first be brought into axial alignment with the spindle and then the gun must be thrust forward to effect pressure-tight engagement between the gun nozzle and the spindle nipple 6, a quantity of grease then being injected by the gun into the spindle nipple whereafter the gun must be withdrawn from engagement.

Referring to Figs. 5 to 7A, in this particular construction, five filling grease guns 16 are used for feeding lubricant to the main conveyor. The satellite chain conveyor has twenty links 17 and the filling guns are spaced from each other on the chain at a distance equal to four times the pitch of one link. Further, the distance between the axes of the sprockets 8 and 9 of the satellite conveyor is equal to six links, this being greater than the distance between the main conveyor spindles 1, and the distance between the axes of any two filling guns 16, considered when these guns are horizontal and their axes are parallel to each other, is less than the distance between the main conveyor spindles. Each sprocket 8 and 9 has eight teeth.

The five filling guns shown at 16 in Fig. 7A, and 16A—B—C—D—E in Fig. 6 are identical in construction and each of them comprises a hollow outer housing 19 formed with diametrically opposite lugs 20 and 21 through which pass two adjacent link pins 18 of the satellite conveyor. The gun is thereby fixedly attached to the chain with its axis at right angles to the line joining the centres of the two link pins 18 and midway between the said pins. The outer housing 19 also comprises a guide bracket 22 which is formed with a spindle-engaging fork end 23 and which, when the gun 16 is in its working position, extends forwardly toward the main conveyor and, as will be explained hereinafter, is adapted to be engaged by a spindle 1 of the main conveyor close to the grease nipple 6. A barrel 24, Fig. 7A, coaxial with the outer housing 19, is slidably arranged in a hole 25 in the front end of the outer housing, a key 26 in the barrel being provided for preventing the barrel turning about its axis relative to the outer housing. A plunger 27 is slidably arranged in the barrel and is of such a length that its rear end projects out at the rear end of the barrel, a stuffing box 28 being provided to prevent leakage of lubricant from between the plunger and barrel. At its front or discharge end the bore of the barrel 24 is counterbored to receive a grease nozzle 29 adapted to cooperate and form a lubricant-tight seal with the nipples 6 on the main conveyor spindles 1. A spring-urged non-return discharge valve 30 is arranged between the discharge end of the bore 31 of the barrel and the discharge orifice of the nozzle. Near the discharge end of the bore of the barrel a grease nipple 32 is screwed into a lateral hollow boss 33 on the barrel, the axis of the nipple being arranged at right angles to the bore of the barrel. The nipple contains a spring-urged non-return inlet valve (not shown).

Apart from the above mentioned boss 33, the whole of the barrel 24 is accurately machined externally. At a position substantially at the centre of length of the barrel and within the outer housing 19, the barrel is formed with an external thread 35 which is screwed into a threaded hole formed centrally in the front end of a cup-shaped guide sleeve 36. The front end of the sleeve abuts against and is located by a shoulder 37 on the barrel. At its rear end the guide sleeve is formed with an enlarged, external cylindrical portion 38 which is machined externally to form an accurate sliding fit in the machined bore of the said hollow outer housing 19. The rear end part of the plunger 27 and part of the rear end of the barrel 24 are fitted within a thimble 39 which is slidably mounted upon the barrel and within the bore of a flanged ferrule 40 screwed into the open rear end of the cup-shaped guide sleeve 36. The front end of the ferrule provides a stop which, in association with a shoulder 41 on the thimble, prevents the plunger and the thimble falling out of the guide sleeve. A coil spring 42 within the outer housing 19 reacts between the front end of the latter and a shoulder 43 on the guide sleeve and thus urges the latter and the barrel rearwards out of the hollow housing, this motion being limited by the shoulder 43A on the barrel contacting the front end of the hollow housing.

The operation of the lubricating apparatus as described thus far is as follows. Assuming that one of the filling grease guns (hereinafter called the "first filling gun") marked 16A in Fig. 6 occupies a horizontal position on the run of the satellite conveyor adjacent to the main conveyor, in which position one of the spindles 1 (hereinafter called the "first spindle" and numbered 1A) of the main conveyor has just fully engaged in the forked end 23 of the said guide bracket 22 on the hollow outer casing 19 of the gun. In this position, which is hereinafter referred to as the "engagement position," the first filling gun and the first spindle are correctly axially aligned. This position is usually reached at a distance rather less than halfway between the two horizontal planes P—P and P′—P′ passing respectively through the centres of the upper and lower sprockets 9 and 8 and disposed at right angles to a line joining these centres, being nearer the lower plane. These planes are hereinafter referred to as the "upper" and "lower transverse planes" respectively. The succeeding, or second, filling gun, marked 16B in Fig. 6, has not yet reached the lower transverse plane P′—P′ and, being radial to the lower sprocket 8, it lies at an angle to that plane. The second spindle 1B of the main conveyor also has not yet reached the lower transverse plane P′—P′ and is, in fact, some considerable distance from it.

At or about the time the first filling gun 16A has reached the engagement position referred to above, the rear face of its thimble 39 engages the sloping cam face 44 of a substantially vertical cam member 45 which is mounted between the two runs of the satellite conveyor chain and the upper and lower sprockets 9 and 8. The end of the cam member 45 nearest to the lower sprocket 8 is pivotally arranged upon a bolt 46 mounted upon a fixed support 47 and between its ends the cam member is also formed with an arcuate slot 48 in which is engaged a locking bolt 50 mounted upon the support. Thus, by loosening the two bolts 46 and 50, the cam member 45 may be swung about the pivot bolt 46 and the sloping cam face 44 may be adjusted toward or away from the rear end of the filling gun thimble 39 in order to vary the amount of frontward movement imparted by the cam to the thimble and the plunger 27 and thus to vary the quantity of lubricant discharged per plunger stroke from the gun.

When the rear end of the filling gun thimble 39 contacts with the sloping cam face 44, the thimble and the plunger 27 are both thrust frontwards toward the discharge end of the gun. Assuming that the pump chamber 31 in the gun barrel 24 is filled with grease, the frontward pressure on the plunger would normally cause this grease to be discharged past the non-return discharge valve 30 and out of the gun nozzle 29. The non-return valve, however, is spring-loaded to a pressure considerably higher than that represented by the force of the coil spring 42 acting upon the guide sleeve 38 divided by the plunger area. Thus, as the pressure builds up in the pump chamber 31, the coil spring 42 will begin to collapse before the discharge valve 30 opens and, therefore, the thimble 39 and the plunger 27 and the barrel 24 and guide sleeve 38 and their associated parts will move forward in unison. In these circumstances, grease will not be discharged past the discharge non-return valve 30. In due course, however, the gun nozzle 29 contacts with the nipple 6 on the main conveyor spindle 1A, whereupon its further frontward movement will be stopped while the further frontward motion of the plunger 27, caused by the engagement of the thimble 39 with the sloping cam face 44 will cause grease to be discharged from the pump chamber through the non-return valve 30 and thus out of the nozzle 29 into the nipple 6.

It will be appreciated that it is essential that the gun nozzle shall not contact the spindle nipple 6 until after the engagement position has been passed. In order to provide adjustment to ensure this, the heads of the pivot and locking bolts 46 and 50 respectively, which secure the cam member 45 to its support 47, are arranged in a longitudinal slot 51 in the support 47 such that the cam member 45 can be moved up or down as desired and, as soon as it has been correctly set, may be fixed by tightening the nuts on the two bolts.

In order to prevent the gun being tilted out of alignment with the nipple 6, when the latter and the gun nozzle 29 are in engagement, the link pins 18 of the satellite conveyor with their rollers 52 are, as the filling guns 16 travel along the straight run adjacent to the main conveyor, guided between two vertical guide bars 53 and 54 (Fig. 6) which are arranged on opposite sides of the said run, parallel to each other and also parallel to the run of the main conveyor.

As soon as the gun thimble 39 has run past the maximum point 44A of the sloping cam face 44, the guide sleeve 36 and the barrel 24 and their associated parts are permitted to return to their original positions relative to the outer housing 19, being thrust rearwardly by the reaction of the said coil spring 42 acting upon the guide sleeve. The thimble 39 and the plunger 27, however, are not by these means returned to their original positions relative to the gun barrel and the latter is not recharged with grease. The re-charging operation is carried out by charging means which will be described hereinafter.

Referring to Fig. 6, during the above described movement of the first filling gun 16A, the second filling gun 16B with its guide bracket 22 will have moved up from its original angular position referred to above into a position in which its axis lies in the lower transverse plane P′—P′. The forked end 23 of the guide bracket 22 on the second filling gun 16B is then in a position to be engaged by the on-coming second spindle 1B of the main conveyor. When the second gun is in this position, the first gun 16A is ahead of it by a distance equal to four times the pitch of the link pins 18 of the satellite chain conveyor and, owing to the aforesaid relationship (the spacing between the main conveyor spindles being greater than the spacing between the filling guns), there is a gap 150 between the forked end 23 of the guide bracket 22 of the second gun 16B and the approaching second main conveyor spindle which has now reached the position 1BB. This gap is maintained as long as the two filling guns are travelling parallel to each other, i. e., until the first gun 16A reaches the upper transverse plane P—P. During this period the gun and the satellite chain 7 have both been moving forward at the same speed as each other, i. e., the speed of the main conveyor, but, as soon as the first gun 16A passes the upper transverse plane P—P, then owing to the subsequent angular movement of the first gun around the axis of the upper sprocket 9, the satellite chain 7 which circumscribes the upper sprocket axis at a smaller radius than the forked end 23 of the guide bracket 22 travels at a slower speed. The main conveyor is thus allowed to over run the satellite conveyor 7 and the main conveyor second spindle closes the gap 150 and comes into driving engagement with the forked end 23 of the guide bracket 22 of the second filling gun 16B. When this happens, the second gun and the second spindle of the main conveyor are accurately axially aligned and are, in fact, in the engagement position as previously described.

The guide bracket 22 of the first filling gun 16A then parts company with the first spindle 1A of the main conveyor and, thereafter, the driving of the satellite conveyor 7 is taken over by the second spindle which is engaged in the forked end 23 of the guide bracket 22 of the second gun 16B and the cycle of operations repeats itself.

The correct functioning of the apparatus depends on a correct relationship between the distance between the centres of the upper and lower sprockets 9 and 8, that is, the length of "run" of the satellite chain during which injection of lubricant takes place, and the pitch of the spindles 1 of the main conveyor, and also between that pitch and the pitch of the filling guns 16.

In practice, these distances cannot be determined by purely theoretical considerations but must be influenced by the pitches of standard chains available. Hence, it sometimes occurs that these practical limitations necessitate dimensions having to be chosen such that the correct relationships cannot be established and as a result the forked guide brackets 22, when they approach the main conveyor just before they reach the lower transverse plane P′—P′, do not "lead in" satisfactorily, but foul the advancing spindle.

This difficulty can be surmounted in various ways. For example, referring to Fig. 8, the lower sprocket 8 can be made larger than the upper sprocket 9 so that the angle of approach of the forked guide bracket 22 is eased, or, as shown in Fig. 9, the lower sprocket 8 may be set further away from the main conveyor than the upper sprocket the guide 53—54 fitted to the run of the satellite conveyor 7 adjacent to the main conveyor being bent as at 53A and 54A giving a parallel portion which steadies the guns during the injection operation, with a sloping portion at the entrance and whereby the angle of approach of the forked bracket 22 is eased.

By a third method, shown in Figs. 10 and 11, instead of being fixedly attached to the satellite chain 7 by two lugs 20 and 21 bolted to two adjacent link pins 18, the filling guns 16 are pivotally attached to the chain by one lug 20A attached by one link pin. The orientation of the gun is determined by an arm 55 substantially at right angles to the forked guide bracket 22 and of convenient length carrying a freely rotating roller 56 at its extremity which runs in a continuous guide 58. This guide does not exactly follow the track of the satellite conveyor chain but is so shaped that the gun is orientated as required. Thus, during the period when the gun, revolving round the lower sprocket 8, approaches the main conveyor it may, as shown in full lines in Fig. 10, be tilted forward of its normal radial position, shown in dotted lines, so that the engaging fork of the guide 22A is held clear of the oncoming spindle instead of fouling it. Similarly as it recedes from the conveyor, during its revolution round the upper sprocket it may be tilted backward of its normal position having the effect of drawing all the remaining guns and brackets forward of their otherwise normal positions.

As mentioned above, each of the filling guns 16 is charged with grease by a grease-charging means, which will now be described. As shown in Figs. 5 to 7A, the horizontal spindle 11 of the upper sprocket 9 of the satellite conveyor is extended outwardly away from the sprocket and upon it is fixed a carrier or cross bar 59 which carries two grease guns 60 (already referred to as "charging guns") near to its opposite ends.

As shown in Figs. 7 and 7A, each of these guns is almost identical in construction to the filling guns 16, but differs therefrom in that it does not include a hooked guide bracket 22 as described above. The plane of rotation of the carrier 59 is parallel to the plane of movement of the satellite conveyor 7 and the axes of the charging guns are arranged horizontally at a right angle to the said plane of movement.

As mentioned above, the filling guns 16 are spaced from each other at a distance of four times the pitch of the link pins 18 of the satellite conveyor. The upper sprocket 9 has eight teeth, from which it follows that at each half revolution of the upper sprocket the axis of a filling gun 16 becomes coaxial with the upper transverse plane P—P. The carrier 59 and the charging guns 60 thereon are so arranged that the axis of a charging gun also becomes coincident with the upper transverse plane P—P at every half revolution of the upper sprocket 9 simultaneously with the filling gun 16 in point of time. Further, the distance of the axis of the charging gun 60 from its centre of rotation is equal to the distance of the inlet nipple 32 of the filling gun 16 from the centre of the upper sprocket 9 when it passes the upper transverse plane P—P. Hence, the charging gun nozzle 61 and the filling gun inlet nipple 32 are correctly aligned and they remain so during the next half revolution.

During this half revolution grease is discharged from the charging gun 60 into the inlet nipple 32 of the filling gun by the cooperation of the outer end of the cam-engaging thimble 62 of the charging gun with the arcuate cam surface 63, Figs. 5, 7, 12 and 13, of a segmental cam member 64 which is mounted upon a supporting disc 65. The latter is turnably mounted upon a boss 66 forming part of one of the bearings 67 in which the spindle 11 of the upper sprocket 9 is turnably arranged. As the outer end of the thimble 62 of the charging gun engages with the arcuate cam face 63, the gun is operated in similar fashion to the filling gun 16. First, the gun is thrust forward until its nozzle comes into sealing engagement with the inlet nipple 32 on the filling gun and thereafter grease is forced by the charging gun plunger 68 through the charging gun nozzle, through the inlet valve in the filling gun nipple 32 and into the pump space 31 of the filling gun thereby recharging the filling gun 16 and thrusting the plunger 27 and thimble 39 back to their original positions. During this operation, the thrust exerted by the charging gun laterally upon the filling gun is resisted by the filling gun receiving additional support through its barrel resting against a curved skid 69 arranged concentrically around the upper sprocket 9.

The segmental cam member 64 is attached to the supporting disc 65 by means of a pivot bolt 70 which passes through a hole near one end of the cam member and a locking bolt 71 which passes through an arcuate slot 72 formed in the member. Thus, by loosening these two bolts the cam member can be angularly adjusted about the pivot bolt 70 in order to vary the amount of forward movement imparted by the cam to the plungers 68 of the charging guns 60 and thus to vary the amount of grease discharged by them. When the correct position is found the cam member may be locked by tightening the two bolts.

Figure 1:
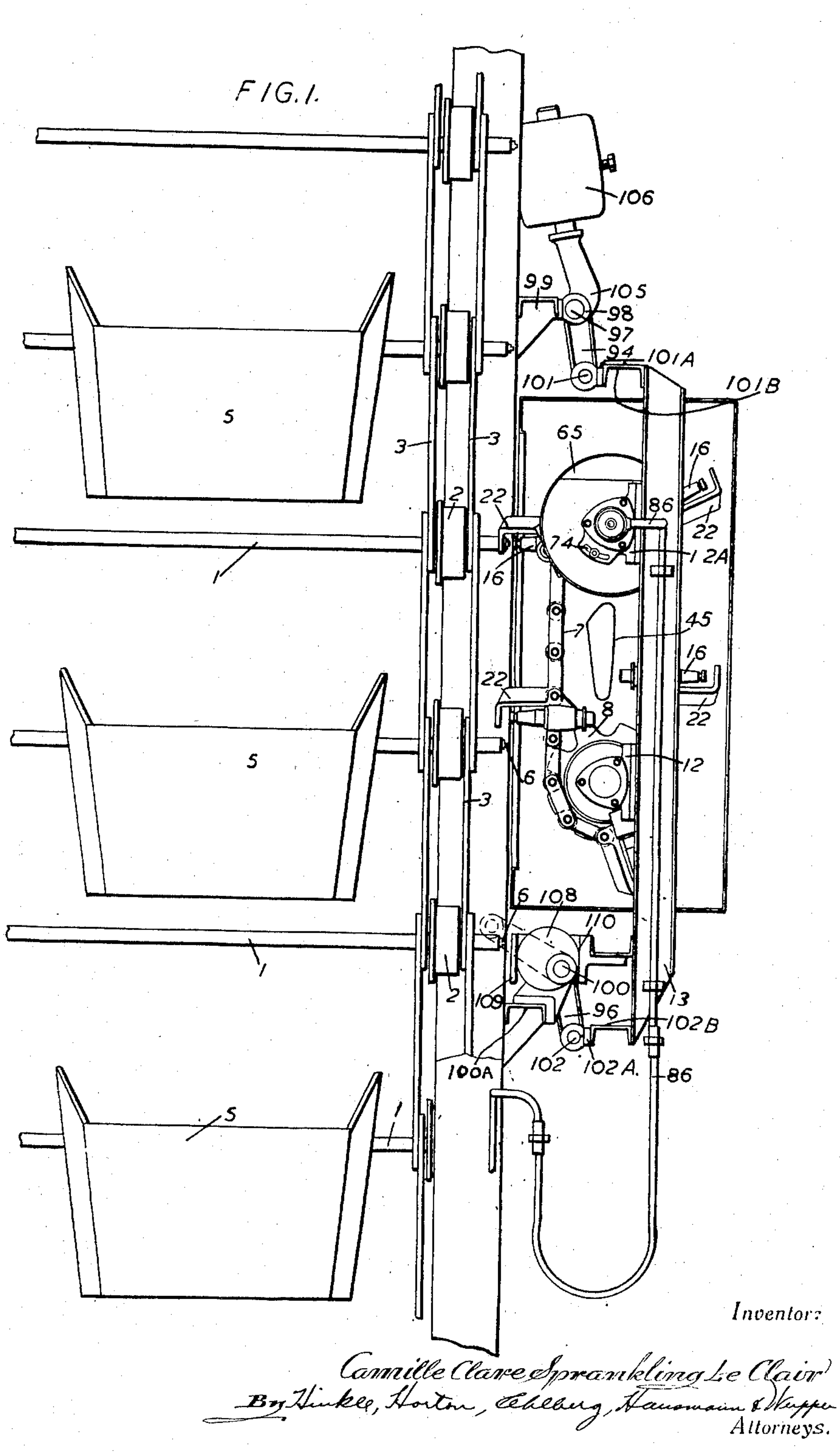
Fig. 1 is a fragmentary front elevation of the main conveyor and shows, partly in section, the lubricating apparatus mounted on one side thereof.
Figure 2:
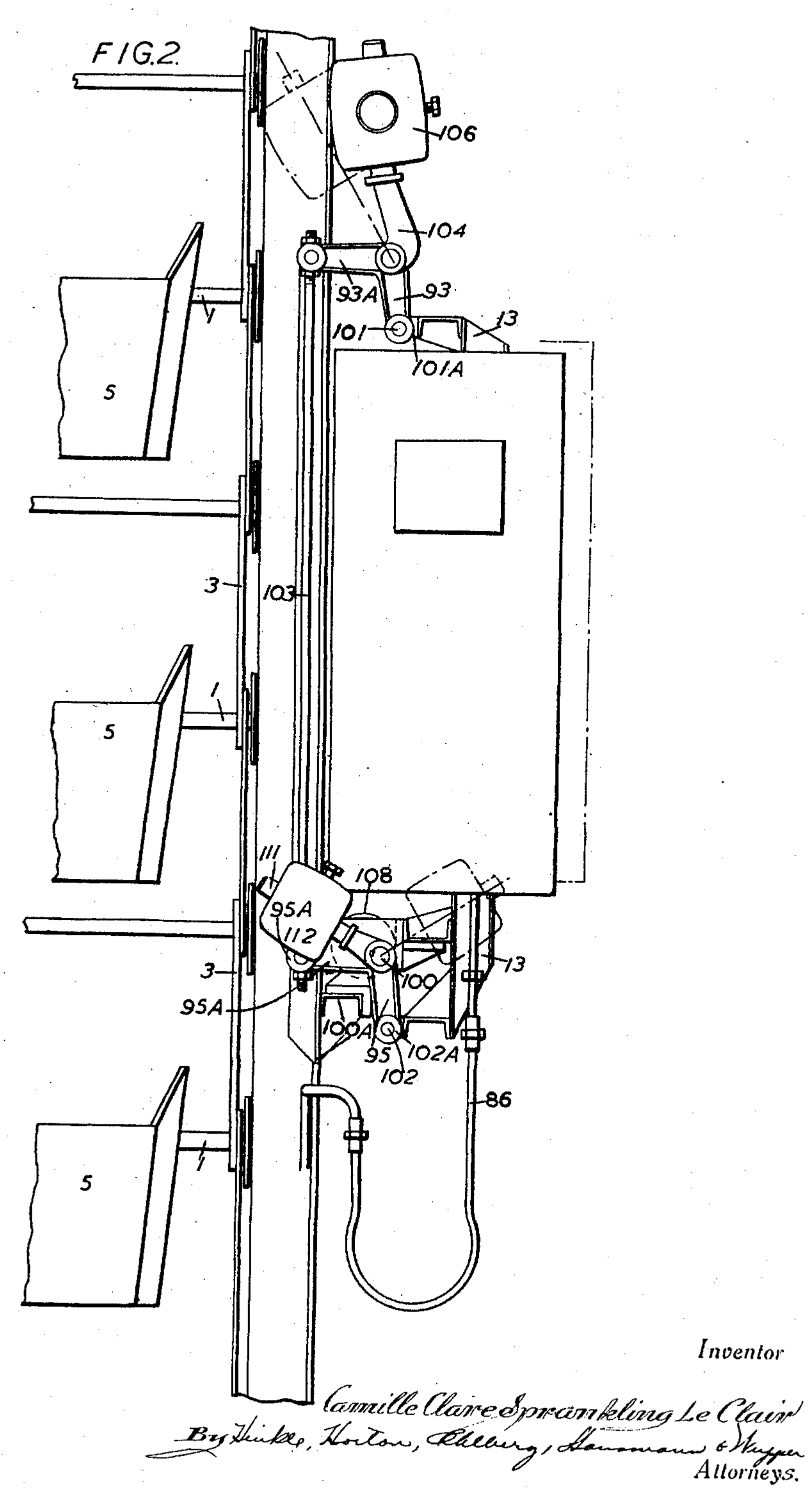
Fig. 2 is also a fragmentary front elevation of the main conveyor but shows the lubricating apparatus enclosed in its casing in side elevation.
Figure 3:
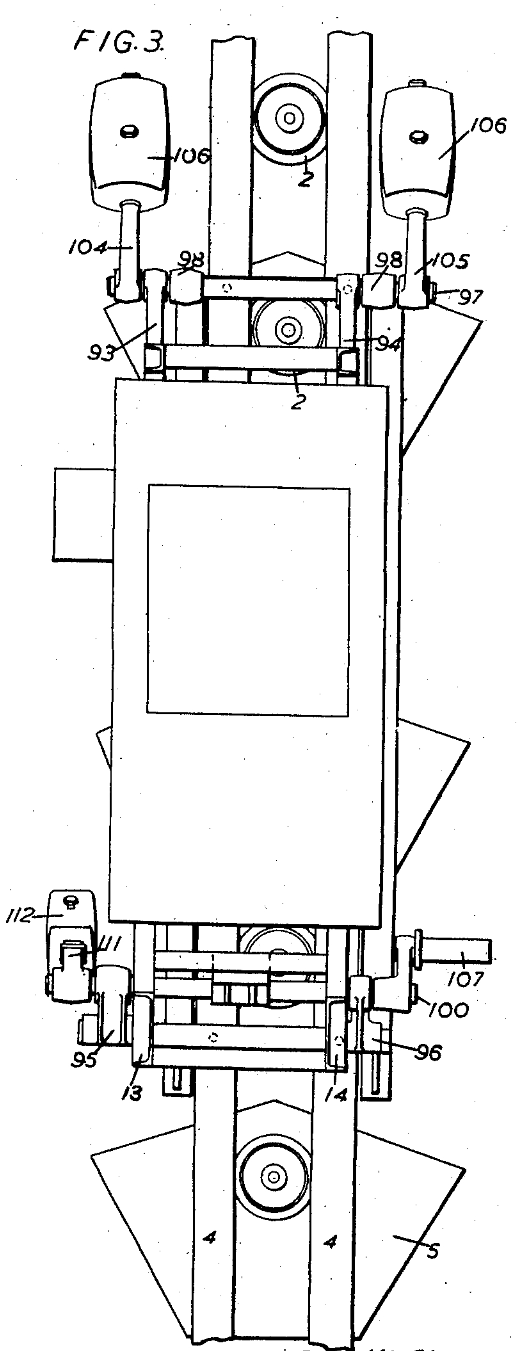
Fig. 3 is a front elevation of the lubricating apparatus enclosed in its casing.
Figures 4, 5:
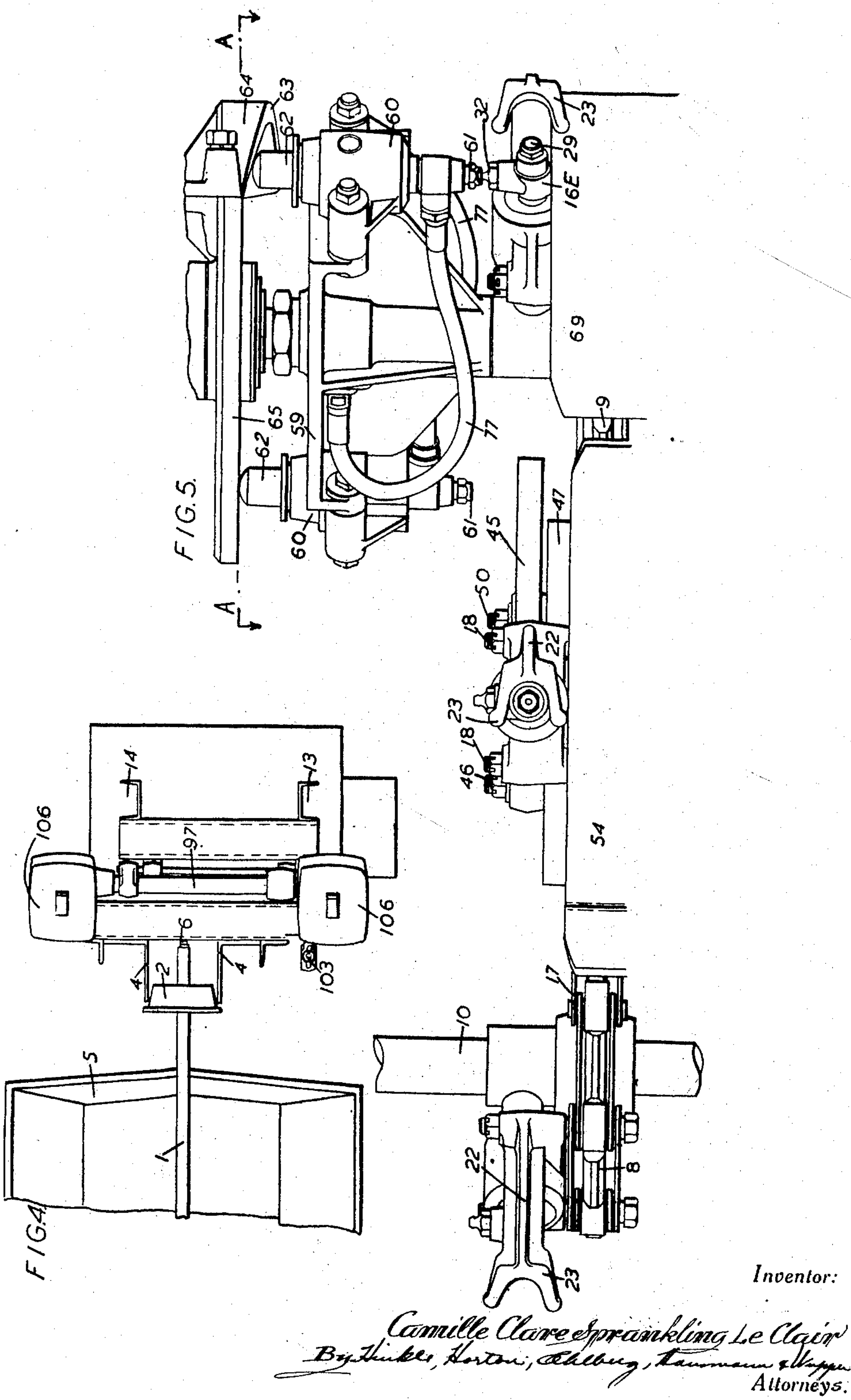
Fig. 4 is a plan view of the lubricating apparatus.
Fig. 5 is an elevation, to a larger scale, of the lubricating apparatus.

Further, the cam-supporting disc 65 may be angularly adjusted around the boss 66 upon which it is mounted and fixed in its adjusted positions by means of a locking bolt 73 which passes through an arcuate slot 74, see also Fig. 1, in the bearing member 67 and is screwed into a hole 75 in the disc 65. By these means, the timing of the charging operation may be varied.

Each charging gun is fitted with a non-return inlet valve 76 similar to those of the filling guns. This valve, however, is not in the form of a nipple but is adapted for pipe connection and is connected by a relatively lengthy curved, swan-necked pipe 77 which is sufficiently flexible to allow it to accommodate the movements of the gun barrel 78. The opposite end of each of these pipes communicates with an annular space 79 (Fig. 7A) within the boss 80 of the charging gun carrier 59, this space being connected by a radial port 81 to an axial conduit 82 (Fig. 7) in the extension of the upper sprocket spindle 11. The outer end of this conduit is counterbored and tapped to receive the inner end of a hollow central spindle member 83 of a banjo-fitting surrounded by a fixed hollow sleeve member 84 in which the spindle is turnable. An annular space 85 in the sleeve 84 is connected by a grease supply pipe 86 to a source of grease under pressure and, by means of radial ports 87 in the hollow banjo spindle 83, is also connected to the axial conduit 88 therein and thence to the axial conduit 82 in the hollow extension sprocket spindle 11. Flexible seals 89 and 90 are provided for preventing grease from the annular space 79 in the boss 80 of the carrier 59 leaking between the boss and the extension hollow sprocket spindle 11. Other flexible seals 91 and 92 are provided for preventing grease from the annular space 85 in the sleeve 84 of the banjo fitting leaking between the hollow spindle 83 of the latter and the sleeve.

Even if the filling guns 16 and their plungers 27 are made of the smallest practicable size the amount of lubricant which the above described lubricating apparatus would discharge if allowed to remain in continuous operation would in most cases be greatly in excess of requirements, and the spindles 1 of the main conveyor would be over lubricated.

One way to reduce the amount of lubricant delivered is to use only one filling gun. If the number of driven means, e. g., the brackets 22, is kept at five as described above, this results in only every fifth spindle receiving a charge of grease. In this case, it is desirable that the number of spindles in the main conveyor shall be other than a multiple of five, so that having lubricated every fifth spindle on the first circuit of the main conveyor, the apparatus will continue on the second and subsequent circuits, to lubricate spindles intermediate to those lubricated in the first circuit until, after five complete circuits, all the spindles in the main conveyor have been lubricated.

Even with this arrangement, for reduced delivery of lubricant, the amount delivered will in some cases be in excess of requirements, and to meet this difficulty the lubricating apparatus may be so mounted that it can be moved into and out of its operating position when required.

Referring to Figs. 1 to 4, the whole lubricating apparatus, therefore, may be carried by a framework which comprises the two transversely-spaced vertical channel members 13 and 14 referred to above and two cross members 101B and 102B and is supported by an upper pair of parallel cranks 93 and 94 and a lower pair of parallel cranks 95 and 96. The upper ends of the upper cranks are attached to a shaft 97 supported in bearing members 98 carried by a fixed structure 99, and the upper ends of the lower cranks are turnably mounted upon a similar shaft 100 also supported by a fixed structure 100A. The lower ends of the upper and lower cranks are turnably supported respectively on shafts 101 and 102 carried by bearing members 101A and 102A supported upon the cross members 101B and 102B at the upper and lower ends of the said channel members 13 and 14. The upper and lower cranks are integral respectively with parallel inwardly-extending cranks 93A and 95A at right angles to themselves and which are connected by a vertical rod 103, see Figs. 2 and 4, the arrangement being such that all the cranks are thereby constrained to move in unison. Two upwardly-extending parallel levers 104 and 105 are fixed to the upper shaft 97 and each is provided with a counterweight 106. The combined effect of the two levers and counterweights is such as to balance the combined weight of the framework (which includes the channel members 13 and 14, the cross members 101B and 102B) and the lubricating apparatus carried thereon. The arrangement is such that the framework and the lubricating apparatus can be swung toward and away from the main conveyor, the framework always moving parallel to itself.

Such motion is imparted to the framework by means of a hand-operated lever 107 which is fixed to the shaft 100 upon which the upper ends of the lower cranks 95 and 96 are turnably mounted, the lever being adapted to turn the shaft 100 through an angle of about 120°. An eccentric 108 is fixed upon the shaft 100 between two vertical flat faces 109 and 110 upon a member forming part of the framework and by cooperation with these faces, causes the framework to move inwardly toward or outwardly away from the main conveyor. An upstanding lever 111 is also mounted upon the shaft 100 and carries a small counterweight 112 which is arranged to provide unstable equilibrium, so that when the apparatus is moved by the handle 107 out of or into its operative position it will stay where placed.

In order to accommodate these movements of the apparatus, the grease supply pipe 86 or a section thereof is made flexible.

Means may also be provided for adjusting the tightness, and for taking-up the wear, of the satellite conveyor chain 7, either by adjusting the distance between the centres of the sprockets 8 and 9 or by a spring loaded shoe pressing on the back run of the chain, or by other suitable means.

In the event of one filling grease gun only being mounted upon the satellite conveyor chain the above mentioned intervening hooked engagement brackets may be attached to the chain in a similar manner to the outer housings 19 and their integral brackets of the filling guns. If, for example, there is one filling gun and four blank engagement brackets only every fifth spindle of the main conveyor will be lubricated. This will be immaterial, however, if the total number of spindles is not an exact multiple of five, a condition which is not usually difficult to comply with. The spindles lubricated on the second and subsequent circuits will be those between those lubricated on the first circuit and, ultimately, after five complete circuits, all the spindles will have been lubricated once.

The charging guns will have to go through the motions of charging as described above, i. e., under the influence of the cam 63, at every revolution whether or not there is a filling-gun present to be charged. This is immaterial, however, since the charging guns would simply make their charging motions idly, because, as described above, they can only deliver grease when their nozzles 61 engage, and encounter the resistance of, the nipples 32 of the filling-guns.

In certain cases, such as when the main conveyor is arranged horizontally, it may be necessary to replace the above described unstable-equilibrium arrangement for holding the lubricating apparatus in its operative and inoperative positions by positive locking means. Such means may comprise a spring-urged bolt or latch adapted to engage with an abutment on the apparatus and conveniently actuated by a Bowden cable and a hand lever.

The forked spindle-engagement brackets as described above may also be replaced by two spaced horse-shoe shaped cheeks fixed to the grease gun housing and providing a wide engagement-entrance for the main conveyor spindles, a bracket or member being fixed between the said cheeks so as to provide a closure for the engagement-entrance. The wide engagement-entrance ensures the correct lateral engagement of the spindles while the said bracket or member ensures longitudinal engagement.

In practice it may be difficult to ensure the exact alignment of the nozzles of the filling and charging grease guns respectively with the nipples on the main conveyor spindles and the nipples on the filling guns.

This difficulty may be overcome by using self-aligning or swivelling nozzles. Thus, referring to Figs. 14 and 15, the barrel 120 of the grease-gun is again fitted with a spring-urged non-return valve 121 but it is counterbored to receive a flexible cup-leather sealing washer 122 having its sensitive sealing lip directed towards the valve. The outer end of the valve spring bears against a flat apertured washer 123 and the spring acts not only to force the non-return valve against its seat but also to provide oil-tight engagement between the flat outer face of the sealing washer 122 and the flat inner end of the flange 124 of a swivelling nozzle. In addition to the said flange the nozzle also comprises a waist 125 and a head 126 and it is also formed with an axial oil-discharge passage 127.

The end of the gun barrel 120 is threaded externally to receive the internally threaded end of a shell nut 128 which encircles part of the swivelling nozzle. The latter is held in position and supported against the sealing washer 122 by two half-moon shaped pins the straight parts 129 of which are passed through holes in the shell nut and lie substantially tangential to the waist 125, the flange 124 resting upon them. The curved parts 130 of the pins embrace the shell nut and lie in locating grooves formed for them in the latter.

It has been found in practice that in certain cases the hooked spindle engaging brackets 23 do not lift or disengage the main conveyor spindles as cleanly as is desirable. After the upper transverse plane P—P is passed the bracket assumes a circular motion sliding up the main conveyor spindle and is intended to lift clear before it reaches the end of the spindle. If it does not lift clear, however, it will tend to wipe across the mouth of the nipple and thereby damage the latter.

Referring to Figure 16, this disadvantage may be overcome by fitting a small tubular extension or sleeve 130 at the end of the spindle so as to act as a protecting sleeve to hold the hooked end of the engagement bracket clear of the nipple. As shown in the figure, the nipple 132 is entirely surrounded and protected by the sleeve. The action of the hooked engagement bracket 23 is shown by the full and broken lines in the figure.

Referring again to Figures 14 and 15, the protecting sleeve 131 also has the advantage of acting as a guide to centralise the swivelling nozzle 126 into position, the final alignment of the nozzle being carried out by the actual contact of the nozzle engagement mouth and the nipple.

It will be understood that both the filling guns and the charging guns may be fitted with swivelling nozzles and that the nipples on the filling guns may be fitted with nipple protecting sleeves as described above in connection with the main conveyor spindle nipples.

It will be understood, that the invention is equally applicable to apparatus for lubricating conveyors operating in any direction other than vertically upwards, as described. For example, the conveyor may run vertically downward, or obliquely upward or downward, or horizontally.

It will also be understood that the invention is equally applicable to lubricating conveyors with lubricant other than grease as specifically mentioned in the foregoing description, such, for example, as oil.

I claim:

1. Apparatus for supplying lubricant to the spindles of a moving main conveyor, each of the spindles having a lubricant receiving nipple, comprising a satellite endless chain conveyor arranged at one side of the main conveyor with one of its runs adjacent to the latter, at least one filling grease gun mounted on said satellite conveyor and including a barrel adapted to be moved from an inoperative position to an operative position and returned to its inoperative position, a lubricant discharge nozzle communicating with said barrel, and a plunger slidable in said barrel and adapted to be moved toward said lubricant nozzle to eject lubricant from said barrel through said nozzle, a plurality of driven means mounted in spaced relationship on said satellite conveyor, a plurality of driving means mounted in spaced relationship on the main conveyor and adapted to cooperate with said driven means so as to drive said satellite conveyor in such manner that said satellite conveyor run is driven in the same direction as the main conveyor, and means independent of and fixed relative to the path of movement of said satellite conveyor and adapted to contact said grease gun while the latter is traveling in said satellite conveyor run so as to cause said barrel to move toward the main conveyor from its inoperative position into its operative position wherein said lubricant discharge nozzle makes a lubricant-tight engagement with a lubricant receiving nipple, to actuate said plunger to eject lubricant from said barrel into said nipple and to permit said barrel to return to its inoperative position.

2. Apparatus as claimed in claim 1 wherein said driven means comprise engagement members one of which is attached to said grease gun.

3. Apparatus for supplying lubricant to the spindles of a moving main conveyor, each of the spindles having a lubricant receiving nipple, comprising a satellite endless chain conveyor arranged at one side of the main conveyor with one of its runs adjacent to the latter, a plurality of filling grease guns mounted in spaced relationship on said satellite conveyor, each of said grease guns including a barrel adapted to be moved from an inoperative position to an operative position and returned to its inoperative position, a lubricant discharge nozzle communicating with said barrel, and a plunger slidable in said barrel and adapted to be moved toward said lubricant discharge nozzle to eject lubricant from said barrel through said nozzle, a plurality of driven means mounted in spaced relationship on said satellite conveyor, a plurality of driving means mounted in spaced relationship on the main conveyor and adapted to cooperate with said driven means so as to drive said satellite conveyor in such manner that said satellite conveyor run is driven in the same direction as and parallel to the main conveyor, and means independent of and fixed relative to the path of movement of said satellite conveyor and adapted to contact said grease guns while the latter are traveling in said satellite conveyor run so as to cause said barrels to move toward the main conveyor from their inoperative positions into their operative positions wherein said lubricant discharge nozzles make a lubricant-tight engagement with the lubricant receiving nipples, to actuate said plungers to eject lubricant from said barrels into said nipples and to permit said barrels to return to their inoperative positions.

4. Apparatus as claimed in claim 3, wherein said driven means comprise engagement members attached to said grease guns.

5. Apparatus as claimed in claim 4 wherein said driving means are integral with the main conveyor spindles.

6. Apparatus for supplying lubricant to the spindles of a moving main conveyor, each of the spindles having a lubricant receiving nipple, comprising a satellite endless chain conveyor arranged at one side of the main conveyor with one of its runs adjacent to the latter, at least one filling grease gun mounted on said satellite conveyor and including a barrel adapted to be moved from an inoperative position to an operative position and returned to its inoperative position, a lubricant discharge nozzle communicating with said barrel, a plunger slidable in said barrel and adapted to be moved toward said lubricant discharge nozzle to eject lubricant from said barrel through said nozzle and means for moving said barrel to its operative position and for moving said plunger relative to said barrel so as to carry out a pumping stroke, a plurality of driven means mounted in spaced relationship on said satellite conveyor, a plurality of driving means mounted in spaced relationship on the main conveyor and adapted to cooperate with said driven means so as to drive said satellite conveyor in such manner that said satellite conveyor run is driven in the same direction as and parallel to the main conveyor, and means independent of and fixed relative to the path of movement of said satellite conveyor and adapted to cooperate with said grease gun while the latter is traveling in said satellite conveyor run so as to contact and move said barrel and plunger moving means through a lubricant discharge operation whereby said barrel is moved toward the main conveyor from its inoperative position into its operative position, said lubricant discharge nozzle makes a lubricant-tight engagement with a lubricant receiving nipple, and said plunger is actuated to eject lubricant from said barrel into said nipple.

7. Apparatus for supplying lubricant to the spindles of a moving main conveyor, each of the spindles having a lubricant receiving nipple, comprising a satellite endless chain conveyor arranged at one side of the main conveyor with one of its runs adjacent to the latter, at least one filling grease gun mounted on said satellite conveyor and including a barrel adapted to be moved from an inoperative position to an operative position and returned to its inoperative position, a lubricant discharge nozzle carried by said barrel, a plunger slidable in said barrel and adapted to be actuated to eject lubricant from the latter through said nozzle, and means for moving said barrel to its operative position and sequentially for moving said plunger in said barrel so as to carry out a pumping stroke, a plurality of driven means mounted in spaced relationship on said satellite conveyor, a plurality of driving means mounted in spaced relationship on the main conveyor and adapted to cooperate with said driven means so as to drive said satellite conveyor in such manner that said satellite conveyor run is driven in the same direction as the main conveyor, and a cam means adapted to contact and actuate said means for moving said barrel and plunger while said grease gun is travelling in said satellite conveyor run thereby to move said barrel toward the main conveyor from its inoperative position into its operative position so that said lubricant discharge nozzle makes a lubricant-tight engagement with a lubricant receiving nipple, to actuate said plunger to eject lubricant from said barrel into said nipple and to permit said barrel to return to its inoperative position.

8. Apparatus as claimed in claim 7 wherein means are provided for adjusting the position of said cam means relative to said satellite conveyor.

9. Apparatus for supplying lubricant to the spindles of a moving main conveyor, each of the spindles having a lubricant receiving nipple, comprising a satellite endless chain conveyor arranged at one side of the main conveyor with one of its runs adjacent to the latter, at least one filling grease gun of the non-self-charging type mounted on said satellite conveyor and including a barrel adapted to be moved from an inoperative position to an operative position and returned to its inoperative position, a lubricant discharge nozzle communicating with said barrel, and a plunger slidable in said barrel and adapted to be moved toward said lubricant discharge nozzle to eject lubricant from said barrel through said nozzle, a plurality of driven means mounted in spaced relationship on said satellite conveyor, a plurality of driving means mounted in spaced relationship on the main conveyor and adapted to cooperate with said driven means so as to drive said satellite conveyor in such manner that said satellite conveyor run is driven in the same direction as the main conveyor, means independent of and fixed relative to the path of movement of said satellite conveyor and adapted to contact said grease gun while the latter is traveling in said satellite conveyor run so as to operate said gun whereby said lubricant discharge nozzle makes a lubricant-tight engagement with a lubricant receiving nipple and said plunger ejects lubricant from said barrel into said nipple, and means for charging said grease gun with lubricant during movement of said satellite conveyor.

10. Apparatus for supplying lubricant to the spindles of a moving main conveyor, each of the spindles having a lubricant receiving nipple, comprising a stationary frame, a movable frame, means eccentrically mounting said movable frame on said stationary frame, a satellite endless chain conveyor carried by said movable frame and being thereby moved into and out of an operative position wherein a run of said satellite conveyor is adjacent and parallel to the main conveyor, at least one filling grease gun mounted on said satellite conveyor and having a lubricant discharge nozzle, a plurality of driven means mounted in spaced relationship on said satellite conveyor, a plurality of driving means mounted in spaced relationship on the main conveyor and adapted to cooperate with said driven means when said satellite conveyor is in its operative position to drive said satellite conveyor in such manner that said satellite conveyor run is driven in the same direction as the main conveyor, and means mounted on said movable frame and fixed relative to the path of movement of said satellite conveyor and adapted to contact and operate said grease gun when the latter is traveling in said satellite conveyor run so as to cause said lubricant discharge nozzle to make a lubricant-tight engagement with said lubricant receiving nipple and said grease gun to eject lubricant into said nipple.

11. Apparatus for supplying lubricant to the spindles of a moving main conveyor, each of the spindles having a lubricant receiving nipple, comprising a stationary frame, a movable frame, means eccentrically mounting said movable frame in said stationary frame, a satellite endless chain conveyor carried by said movable frame and being thereby moved into and out of an operative position wherein a run of said satellite conveyor is adjacent and parallel to the main conveyor, means associated with said movable frame for producing unstable equilibrium so that said movable frame and said satellite conveyor will remain in its adjusted position without accidental dislodgement, at least one filling grease gun mounted on said satellite conveyor and having a lubricant discharge nozzle, a plurality of driven means mounted in spaced relationship on said satellite conveyor, a plurality of driving means mounted in spaced relationship on the main conveyor and adapted to cooperate with said driven means when said satellite conveyor is in its operative position to drive said satellite conveyor in such manner that said satellite conveyor run is driven in the same direction as the main conveyor, and means mounted on said movable frame and fixed relative to the path of movement of said satellite conveyor and adapted to contact and operate said grease gun when the latter is travelling in said satellite conveyor run so as to cause said lubricant discharge nozzle to make a lubricant-tight engagement with said lubricant receiving nipple and said grease gun to eject lubricant into said nipple.

12. Apparatus as claimed in claim 1, including means for moving said satellite conveyor between an operative position and an inoperative position.

13. Apparatus for supplying lubricant to the spindles of a moving main conveyor, each of the spindles having a lubricant receiving nipple, comprising a satellite endless chain conveyor arranged at one side of the main conveyor with one of its runs adjacent and parallel to the latter, at least one filling grease gun mounted on said satellite conveyor and including a barrel adapted to be moved from an inoperative position to an operative position and returned to its inoperative position, a lubricant discharge nozzle, means for mounting said nozzle on said barrel so that it may be axially misaligned with respect to said barrel in order that it properly align itself with one of the lubricant receiving nipples when said barrel is moved to its operative position, and a plunger slidable in said barrel and adapted to be moved toward said lubricant discharge nozzle to eject lubricant from said barrel through said nozzle, a plurality of driven means mounted in spaced relationship on said satellite conveyor, a plurality of driving means mounted in spaced relationship on the main conveyor and adapted to cooperate with said driven means so as to drive said satellite conveyor in such manner that said satellite conveyor run is driven in the same direction as the main conveyor, and means independent of and fixed relative to the path of movement of said satellite conveyor and adapted to contact said grease gun while the latter is traveling in said satellite conveyor run so as to cause said barrel to move toward the main conveyor from its inoperative position into its operative position wherein said lubricant discharge nozzle makes a self-aligning lubricant-tight engagement with a lubricant receiving nipple, to actuate said plunger to eject lubricant from said barrel into said nipple and to permit said barrel to return to its inoperative position.

14. Apparatus for supplying lubricant to the spindles of a moving main conveyor, comprising a lubricant receiving nipple for each of the conveyor spindles, a protective member for each of said nipples to prevent damage to said nipples, a satellite endless conveyor arranged at one side of the main conveyor with one of its runs adjacent to the latter, at least one filling grease gun mounted on said satellite conveyor and including a barrel adapted to be moved from an inoperative position to an operative position and returned to its inoperative position, a lubricant discharge nozzle communicating with said barrel, and a plunger slidable in said barrel and adapted to be actuated to eject lubricant from the latter through said nozzle, a plurality of driven means mounted in spaced relationship on said satellite conveyor, a plurality of driving means mounted in spaced relationship on the main conveyor and adapted to cooperate with said driven means so as to drive said satellite conveyor in such manner that said satellite conveyor run is driven in the same direction as the main conveyor, and means adapted to cooperate with said grease gun while the latter is traveling in said satellite conveyor run so as to cause said barrel to move toward the main conveyor from its inoperative position into its operative position wherein said lubricant discharge nozzle makes a lubricant-tight engagement with a lubricant receiving nipple, to actuate said plunger to eject lubricant from said barrel into said nipple and to permit said barrel to return to its inoperative position.

15. Apparatus for supplying lubricant to the spindles of a moving main conveyor, comprising a lubricant receiving nipple for each of the conveyor spindles, an open ended sleeve encompassing each of said nipples to prevent damage thereto, a satellite endless conveyor arranged at one side of the main conveyor with one of its runs adjacent to the latter, at least one filling grease gun mounted on said satellite conveyor and including a barrel adapted to be moved from an inoperative position to an operative position and returned to its inoperative position, a lubricant discharge nozzle, means for mounting said nozzle on said barrel so that it has a self aligning motion when in contact with one of the lubricant receiving nipples and its encompassing sleeve, and a plunger slidable in said barrel and adapted to be actuated to eject lubricant from the latter through said nozzle, a plurality of driven means mounted in spaced relationship on said satellite conveyor, a plurality of driving means mounted in spaced relationship on the main conveyor and adapted to cooperate with said driven means so as to drive said satellite conveyor in such manner that said satellite conveyor run is driven in the same direction as the main conveyor, and means adapted to cooperate with said grease gun while the latter is traveling in said satellite conveyor run so as to cause said barrel to move toward the main conveyor from its inoperative position into its operative position wherein said lubricant discharge nozzle makes a self-aligning lubricant-tight engagement with a lubricant receiving nipple, to actuate said plunger to eject lubricant from said barrel into said nipple and to permit said barrel to return to its inoperative position.

16. Apparatus as claimed in claim 1 wherein said driving means are integral with said main conveyor spindles.

17. Apparatus for supplying lubricant to the spindles of a moving main conveyor, each of the spindles having a lubricant receiving nipple, comprising a satellite endless chain conveyor arranged at one side of the main conveyor with one of its runs adjacent to the latter, at least one filling grease gun of the non-self-charging type mounted on said satellite conveyor and having a barrel adapted to be moved from an inoperative position to an operative position and returned to its inoperative position, a lubricant charging nipple carried by and communicating with said barrel, a lubricant discharge nozzle communicating with said barrel, and a plunger slidable in said barrel and adapted to be moved toward said lubricant discharge nozzle to eject lubricant from said barrel through said nozzle, a plurality of driven means mounted in spaced relationship on said satellite conveyor, a plurality of driving means mounted in spaced relationship on the main conveyor and adapted to cooperate with said driven means so as to drive said satellite conveyor in such manner that said satellite conveyor run is driven in the same direction as the main conveyor, means adapted to cooperate with said grease gun while the latter is traveling in said satellite conveyor run so as to operate said gun whereby said lubricant discharge nozzle makes a lubricant-tight engagement with a lubricant receiving nipple and said plunger ejects lubricant from said barrel into said nipple, and means for charging said grease gun with lubricant during movement of said satellite conveyor comprising a rotatable supporting member driven by said satellite conveyor and rotatable in a plane parallel to the plane of movement of said satellite conveyor, at least one charging grease gun carried by said member and including a barrel forming a cylinder, a lubricant discharge nozzle communicating with said second named barrel and adapted to be moved into lubricant-tight engagement with said lubricant charging nipple on said filling grease gun, and a plunger slidable in said cylinder and adapted to be actuated to eject lubricant from the latter through said last named nozzle, and means for actuating said plunger.

18. Apparatus for supplying lubricant to the spindles of a moving main conveyor, each of the spindles having a lubricant receiving nipple, comprising a satellite endless chain conveyor arranged at one side of the main conveyor with one of its runs adjacent to the latter, said satellite conveyor including at least one sprocket and a rotatable shaft upon which said sprocket is mounted, at least one filling grease gun of the non-self-charging type mounted on said satellite conveyor and including a barrel adapted to be moved from an inoperative position to an operative position and returned to its inoperative position, a lubricant charging nipple carried by and communicating with said barrel, a lubricant discharge nozzle communicating with said barrel, and a plunger slidable in said barrel and adapted to be moved toward said lubricant discharge nozzle to eject lubricant from said barrel through said nozzle, a plurality of driven means mounted in spaced relationship on said satellite conveyor, a plurality of driving means mounted in spaced relationship on the main conveyor and adapted to cooperate with said driven means so as to drive said satellite conveyor in such manner that said satellite conveyor run is driven in the same direction as the main conveyor, means adapted to cooperate with said grease gun while the latter is traveling in said satellite conveyor run so as to operate said gun whereby said lubricant discharge nozzle makes a lubricant-tight engagement with a lubricant receiving nipple and said plunger ejects lubricant from said barrel into said nipple, and means for charging said grease gun with lubricant during movement of said satellite conveyor comprising a rotatable supporting member secured to and rotatable with said sprocket, at least one charging grease gun carried by said member and including a barrel forming a cylinder, a lubricant discharge nozzle communicating with said barrel and adapted to be moved into lubricant-tight engagement with said lubricant charging nipple on said filling grease gun, and a plunger slidable in said barrel and adapted to be actuated to eject lubricant from the latter through said last named nozzle, and means for actuating said plunger.

19. Apparatus as claimed in claim 18 wherein said plunger actuating means comprises a fixed cam member into contact with which said charging grease gun is brought by rotation of said supporting member.

20. Apparatus as claimed in claim 18 including a supply duct formed in said shaft having an inlet adapted to be connected to a source of lubricant, and means connecting said duct with said barrel of said charging grease gun.

21. Apparatus for supplying lubricant to the spindles of a moving main conveyor having a lubricant receiving nipple, comprising a satellite endless chain conveyor arranged at one side of the main conveyor with one of its runs adjacent to the latter, at least one filling grease gun of the non-self-charging type mounted on said satellite conveyor and having a lubricant discharge nozzle and a lubricant charging nipple, a plurality of driven means mounted in spaced relationship on said satellite conveyor, a plurality of driving means mounted in spaced relationship on the main conveyor and adapted to cooperate with said driven means so as to drive said satellite conveyor in such manner that said satellite conveyor run is driven in the same direction as the main conveyor, means for operating said filling grease gun while the latter is traveling in said satellite conveyor run to cause said lubricant discharge nozzle to engage a lubricant receiving nipple on the main conveyor and to carry out a lubricating operation, and means for charging said filling grease gun with lubricant during movement of said satellite conveyor comprising a rotatable supporting member driven by said satellite conveyor and rotatable in a plane parallel to the plane of movement of said satellite conveyor, at least one charging grease gun carried by said member and having a lubricant discharge nozzle adapted to be engaged with said lubricant charging nipple on said filling grease gun, and means for operating said charging grease gun to cause its discharge nozzle to engage said lubricant charging nipple and to charge said filling grease gun with lubricant.

22. Apparatus for supplying lubricant to the spindles of a moving main conveyor having a lubricant receiving nipple, comprising a satellite endless chain conveyor arranged at one side of the main conveyor with one of its runs adjacent to the latter, at least one filling grease gun of the non-self-charging type mounted on said satellite conveyor and having a lubricant discharge nozzle and a lubricant charging nipple, a plurality of driven means mounted in spaced relationship on said satellite conveyor, a plurality of driving means mounted in spaced relationship on the main conveyor and adapted to cooperate with said driven means so as to drive said satellite conveyor in such manner that said satellite conveyor run is driven in the same direction as the main conveyor, means for operating said filling grease gun while the latter is traveling in said satellite conveyor run to cause said lubricant discharge nozzle to engage a lubricant receiving nipple on the main conveyor and to carry out a lubricating operation, and means for charging said filling grease gun with lubricant during movement of said satellite conveyor comprising a supporting member, a hollow shaft mounting said supporting member and rotatable with a sprocket of said satellite conveyor so that said supporting member is rotatable in a plane parallel to the plane of movement of said satellite conveyor, at least one charging grease gun carried by said member and having a lubricant discharge nozzle adapted to be engaged with said lubricant charging nipple on said filling grease gun, means for operating said charging grease gun to cause its discharge nozzle to engage said lubricant charging nipple and to charge said filling grease gun with lubricant, and means including said hollow shaft connecting said charging grease gun to a source of lubricant under pressure.

23. Apparatus for supplying lubricant to the spindles of a moving main conveyor having a lubricant receiving nipple, comprising a satellite endless chain conveyor arranged at one side of the main conveyor with one of its runs adjacent to the latter, at least one filling grease gun of the non-self-charging type mounted on said satellite conveyor and having a lubricant discharge nozzle and a lubricant charging nipple, a plurality of driven means mounted in spaced relationship on said satellite conveyor, a plurality of driving means mounted in spaced relationship on the main conveyor and adapted to cooperate with said driven means so as to drive said satellite conveyor in such manner that said satellite conveyor run is driven in the same direction as the main conveyor, means for operating said filling grease gun while the latter is traveling in said satellite conveyor run to cause said lubricant discharge nozzle to engage a lubricant receiving nipple on the main conveyor and to carry out a lubricating operation, and means for charging said filling grease gun with lubricant during movement of said satellite conveyor comprising a rotatable supporting member driven by said satellite conveyor and rotatable in a plane parallel to the plane of movement of said satellite conveyor, at least one charging grease gun carried by said member and having a lubricant discharge nozzle adapted to be engaged with said lubricant charging nipple on said filling grease gun, and means including a fixed cam member for operating said charging grease gun to cause its discharge nozzle to engage said lubricant charging nipple and to charge said filling grease gun with lubricant.

CAMILLE CLARE SPRANKLING LE CLAIR.

REFERENCES CITED

The following references are of record in the file of this patent:

UNITED STATES PATENTS

| Number | Name | Date |
|---|---|---|
| 1,416,668 | Abbott | May 23, 1922 |
| 1,933,464 | West | Oct. 31, 1933 |

FOREIGN PATENTS

| Number | Country | Date |
|---|---|---|
| 238,580 | Great Britain | Aug. 5, 1926 |
| 397,855 | Great Britain | Aug. 29, 1933 |